United States Patent [19]

Nose et al.

[11] Patent Number: 5,667,308

[45] Date of Patent: Sep. 16, 1997

[54] BEARING DEVICE FOR USE IN A MOTOR

[75] Inventors: Tamotsu Nose; Hideki Kanebako, both of Shimosuwa-machi, Japan

[73] Assignee: Sanaky Seiki Mfg. Co., Ltd., Nagano-ken, Japan

[21] Appl. No.: 440,314

[22] Filed: May 12, 1995

[30] Foreign Application Priority Data

| May 17, 1994 | [JP] | Japan | 6-126983 |
| Jun. 21, 1994 | [JP] | Japan | 6-162670 |
| Jun. 22, 1994 | [JP] | Japan | 6-163200 |

[51] Int. Cl.$^6$ ............................................. F16C 32/06
[52] U.S. Cl. ........................... 384/99; 384/115; 384/100
[58] Field of Search ......................... 384/99, 123, 115, 384/113, 114

[56] References Cited

U.S. PATENT DOCUMENTS

| 3,210,044 | 10/1965 | Mori | 384/99 |
| 3,844,630 | 10/1974 | Lechner | 384/99 |
| 4,084,861 | 4/1978 | Greenberg | 384/99 |

*Primary Examiner*—Lenard A. Footland
*Attorney, Agent, or Firm*—McAulay Fisher Nissen Goldberg & Kiel, LLP

[57] ABSTRACT

A dynamic pressure bearing device for use in a motor including a shaft and a frame. Two bearings interconnect the shaft and the frame of the motor. The two bearings contain a noncompressible fluid. A mechanism for minimizing axial vibrational movement of the shaft is part of the bearing device. In one arrangement, the mechanism is a device connected to the shaft, such that a narrow gap is defined between an end of the device and the frame to provide a flow resistance to the noncompressible fluid. The device connected to the shaft maintains a decreasing width to minimize a loss of torque in the motor.

27 Claims, 6 Drawing Sheets

FIG. 10

BEARING DEVICE FOR USE IN A MOTOR

BACKGROUND

A) Field of Invention

The present invention relates to a bearing device for use in a motor, and more particularly to a dynamic pressure bearing device for use in a motor which prevents vibrational movement of a shaft in the motor and minimizes a loss of torque in the motor.

B) Description of Related Art

Figure 1:
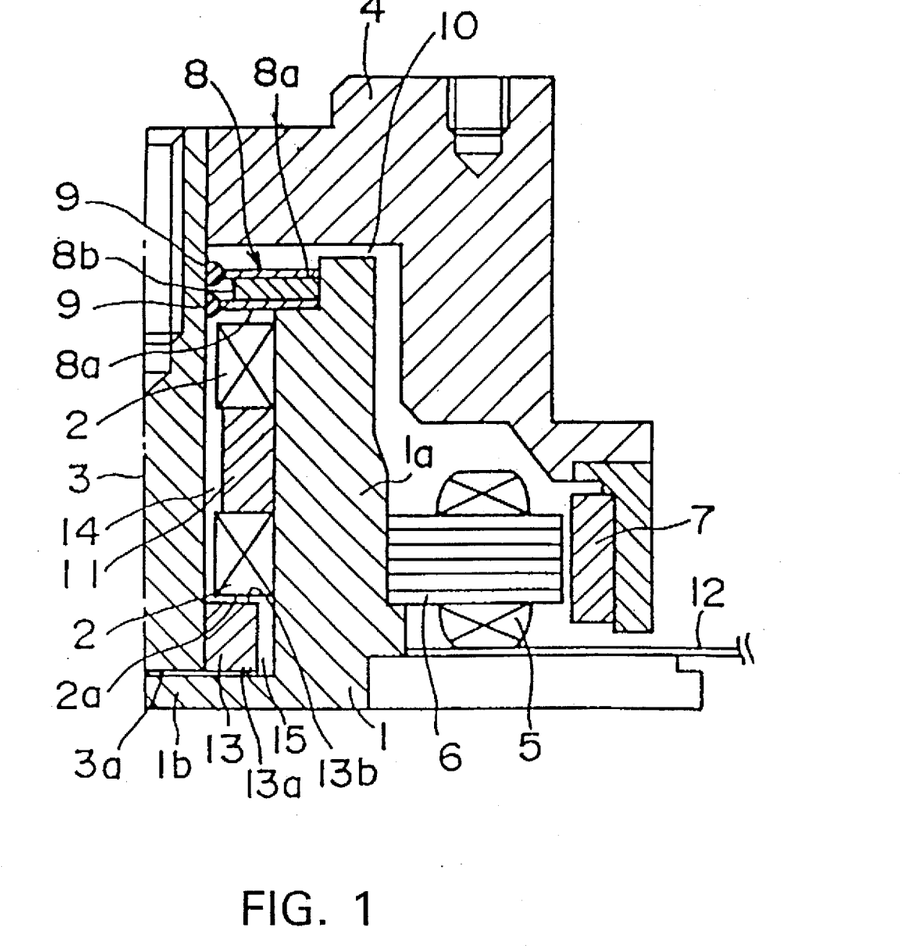
FIG. 1 illustrates a transverse sectional view of a motor for use in a hard disk drive which uses a conventional dynamic pressure bearing device.

FIG. 1 shows a conventional dynamic pressure bearing device for use in a motor for a hard disk drive. Referring to FIG. 1, a fixed member or frame 1 is shown to include an integral bearing holder 1a which extends in an upright direction and is cylindrical in shape. The frame 1 with the bearing holder 1a has a concave shape, with a closed end at a bottom of the frame 1 and an open end at a top of the frame 1. A stator core 6 is fixed to an outer peripheral surface of the bearing holder 1a and a coil 5 is wound on the stator core 6.

Two radial-slide bearings 2 are sectored to an inner periphery of the bearing holder 1a where a center shaft 3, which revolves during operation of the motor, extends through the radial-slide bearings 2. A dynamic-pressure groove is formed in either an outer peripheral surface of the center shaft 3 or an inner peripheral surface of each of the radial-slide bearings 2. The dynamic-pressure groove has, by way of example, a herringbone shape. An oil or non-compressible fluid is filled in a space between the center shaft 3 and the radial-slide bearings 2. Under this arrangement, a radial-dynamic pressure is developed between the center shaft 3 and the radial-slide bearings 2 so as to prevent radial vibrational movement of the center shaft 3 when it is rotated within the radial-slide bearings 2.

An annular thrust plate 13 is fit around a lower end of the center shaft 3 which is adjacent to the closed end of frame 1. The annular thrust plate 13 has an outer diameter which is greater than an inner diameter of the radial-slide bearings 2, as measured from the a center of the center of shaft 3. The annular thrust plate 13 has an end surface 13a which is substantially flush with an end surface 3a of the center shaft 3. A dynamic-pressure groove is formed in either (i) the lower end 13a of the annular thrust plate 13 and the Connected lower end 3a of the center shaft 3, or (ii) a bottom 1b of the frame 1. A dynamic pressure groove is also formed in either an upper end 13b of the annular thrust plate 13 or a lower end 2a of the radial-slide bearing 2 located adjacent to the closed end of the frame 1.

A lubricant is filled in both a clearance formed between the upper end 13b of the annular thrust plate 13 and the radial-slide bearing 2 and a clearance formed between the lower end 13a of the annular thrust plate 13 and the bottom 1b. That is, the lubricant is filled in a space 15 within which the annular thrust plate 13 is received. As a result, a thrust-dynamic pressure is developed between (i) the lower end 13a of the annular thrust plate 13 and the connected lower end 3a of the center shaft 3, and (ii) the bottom 1b of the frame 1. A thrust-dynamic pressure is also developed between the upper end 13b of the annular thrust plate 13 and the lower end 2a of the radial-slide bearing 2 adjacent to the closed end of the frame 1. These pressures prevent vibration of the center shaft 3 in a thrust direction. Thus, the center shaft 3 is well balanced when it is rotated on the bottom 1b of the recess.

A hub 4 is fit on an upper end of the center shaft 3 adjacent to the open end of the frame 1 and is shaped as to cover the stator core 6 and the coil 5. Although not shown, disks are loaded on an outer periphery of the hub 4. A drive magnet 7 is fixed to an inner periphery of the hub 4 and is positioned to face the stator core 6.

A passage 10 is defined between an interior and exterior of the bearing holder 1a. A magnetic-fluid seal 8 is present in the passage 10 above the radial-slide bearing 2 near the open end of the frame 1. The magnetic-fluid seal 8 includes a magnet 8b, and a pair of pole pieces 8a. The pole pieces 8a are adapted to sandwich axial ends of the magnet 8b and form a magnetic passage. A magnetic fluid 9 is held between an inner peripheral surface of the pole pieces 8a and an outer peripheral surface of the center shaft 3. The magnetic-fluid seal 8 is present to prevent leakage of the lubricant placed within the bearing holder 1a, and to prevent the entry of dust or other particles into the interior of the bearing.

A predetermined drive voltage is applied from an external power source, not shown, to the coil 5 through a flexible board 12 so as to rotate the hub 4 with the loaded disks. Also provided is a bearing collar 11 which is sandwiched between the radial-slide bearings 2.

In order to resist vibration and shock and thus effectively read and write data on the disks, the motor is designed to maintain the thrust-dynamic pressures as described above. For example, if a shock or vibration is experienced which pushes the center shaft 3 in the downward direction, the volume of the space 15 beneath lower ends 3a and 13a is reduced by an amount proportional to a cross sectional area of the center shaft 3 and annular thrust plate 13. This loss in volume causes the lubricant within the space 15 to flow toward the radial-slide bearing 2 near the closed end of the frame 1. However, the clearance between the radial slide-bearing 2 and the center shaft 3 is so small it acts as a throttle to a provide large flow resistance. Thus, movement of the center shaft 3 toward the closed end of the frame 1 is prevented.

On the other hand, if a vibration or shock is experience which pulls the center shaft 3 in an upward direction, the volume of the space 15 beneath ends 3a and 13a increases. This increase in volume creates an unwanted vacuum when the center shaft 3 is rotated above a certain speed. However, the thrust dynamic pressure developed on the upper surface 13b of the annular thrust plate 13 prevents movement of the center shaft 3 in an upward direction and thus prevents the unwanted vacuum.

Nevertheless, many problems result from providing the above-described pressures which are required to prevent movement of the center shaft 3 during shock or vibration. In particular, the center shaft 3 is subjected to a substantial loss in torque which is undesirable.

Additionally, a number of minute clearances must be defined which require severe manufacturing tolerances that are difficult to obtain. Specifically, a minute clearance must be defined between (i) the lower end 13a of the annular thrust plate 13 and the connected lower end 3a of the center shaft 3, and (ii) the bottom 1b. Moreover, a minute clearance must be defined between the upper end 13b of the annular thrust plate 13 and the lower end 2a of the radial-slide bearing 2 adjacent to the closed end of the frame 1.

Lastly, to develop the thrust dynamic pressures necessary to prevent an unwanted movement of the center shaft 3, grooves must also be formed in opposite sides 13a and 13b of the annular thrust plate 13. Manufacturing these grooves is undesirable given that it results in an increased production cost.

OBJECTS AND SUMMARY OF THE INVENTION

For the above reasons, there has been a longstanding need for a dynamic pressure bearing device which would provide stability against shocks or vibrations, would not subject the motor to a loss in torque, would not require severe manufacturing tolerances, and would not require a large number of pressure grooves. It is accordingly a primary object of the present invention to provide a bearing device satisfying this longstanding need.

In accordance with the invention, a dynamic pressure bearing device is provided for use in a motor which includes a shaft and a frame. The dynamic pressure bearing device comprises a first bearing which is connected to either the shaft or the frame, a second bearing which is connected to either the shaft or the frame, a noncompressible fluid which is filled in a region between the shaft and the frame, and a mechanism for minimizing axial vibrational movement of said shaft and a loss of torque in the motor.

Also in accordance with the invention, a dynamic pressure bearing device is provided which includes a fixed member having a closed end and an open end, where the fixed member is shaped to define a recess, a revolving shaft which is received within the recess of the fixed member, a thrust plate which is adapted to support the revolving shaft in a thrust direction and form a bottom of the frame, a radial bearing which is adapted to support the revolving shaft in a radial direction, a noncompressible fluid which is filled in a sliding surface of the radial bearing, and a large diameter portion which is connected to an end of the revolving shaft, where the large diameter portion is located closer to the closed end of the fixed member than the radial bearing. In this dynamic pressure bearing device, a narrow gap is defined between the large diameter portion and a surface of the fixed member, the noncompressible fluid is filled in a space within which the large diameter portion is received, a distance to an end of the large diameter portion, as measured from a center of the revolving shaft, is larger than a distance to a surface of the radial bearing as measured from the center of the revolving shaft, and the large diameter portion maintains a width which decreases in a direction toward an outward end of the large diameter portion.

Additional objects and advantages of the invention will be apparent from the foregoing general description and following detailed description and drawings. It is to be understood that the descriptions are exemplary and explanatory only and are not restrictive of the invention as claimed.

BRIEF DESCRIPTION OF THE DRAWINGS

The accompanying drawings are included to provide an understanding of the invention and constitute a part of the specification.

DETAILED DESCRIPTION OF THE INVENTION

Reference will now be made in detail to numerous embodiments of the invention as illustrated in the accompanying drawings. Parts which are identical to those referred to in FIG. 1 and which function in the same way are given like reference numerals and will not be described herein.

Figure 2:
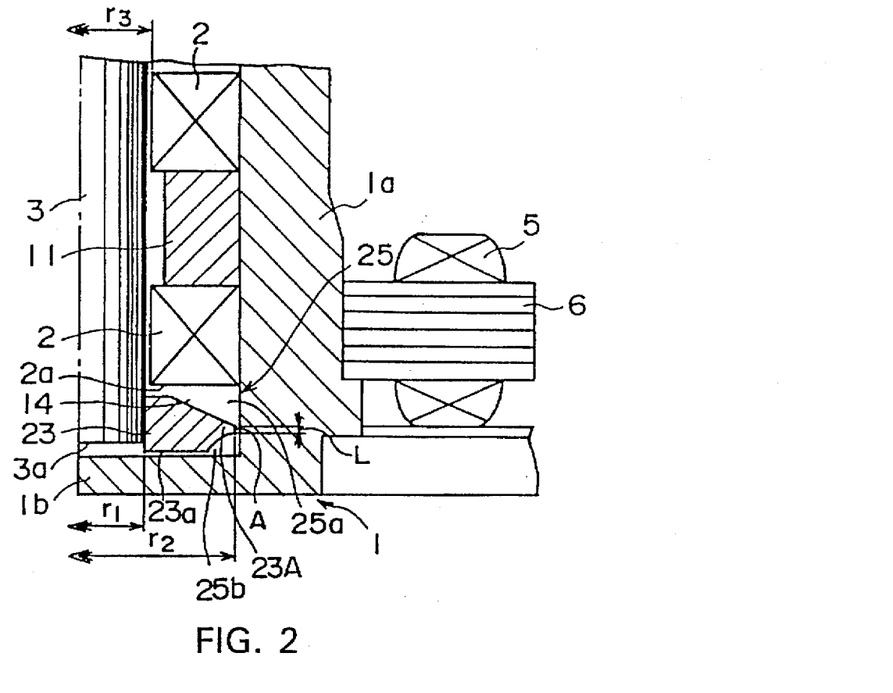
FIG. 2 illustrates a transverse sectional view showing a spindle motor for use in a hard disk drive into which a dynamic pressure bearing device is incorporated according to a first embodiment of the present invention.

Referring to FIG. 2, which illustrates a first embodiment of the present invention, a revolving shaft 3 is provided which includes a large diameter portion 23 that is located closer to a closed end of frame 1 than a radial-slide bearing 2. The large diameter portion 23 has an outer diameter r2 which is greater than a diameter r3 of a sliding surface of the radial-slide bearings 2. The large diameter portion 23 is substantially in the form of an abacus bead and has a diameter which increases toward a projection 23A. A narrow gap A is defined between the projection 23A and the fixed member 1 or the bearing holder 1a.

In this first embodiment, the narrow gap A is in a range from 3 to 30 µm. Also, the revolving shaft 3 has an outer diameter r1, whereas, the large diameter portion 23 has a maximum outer diameter r2 such that a factor n, which equals r2/r1, is in a range from 1.2 to 3.0.

The large diameter portion 23 is contained within a space 25 which is surrounded by the bearing holder 1a, one of the radial-slide bearings 2 adjacent to the closed end of the frame 1, a bottom 1b of the frame 1, and the revolving shaft 3. The space 25 is axially divided into an open side space 25a above the narrow gap A and a closed side space 25b below the narrow gap A.

The large diameter portion 23 has a surface 23a adjacent to the closed end of the frame 1 which projects from an end 3a of the revolving shaft 3. A thrust dynamic pressure 9 groove is formed in either the surface 23a of the large diameter portion 23 or the bottom 1b of the frame 1.

A lubricant or non-compressible fluid 14 is filled in the recess of the bearing holder 1a below a magnetic-fluid seal 8, which is not shown, as well as the space 25. As such, a thrust dynamic pressure is developed between the lower end 23a of the large diameter portion 23 and the bottom 1b of the frame 1 to urge the revolving shaft 3 toward the open end of the frame 1.

A stator core 6 has a magnetic center which is offset from that of a drive magnet 7. This known arrangement produces a magnetic attraction which urges the revolving shaft 3 toward the closed end of the frame. The revolving shaft 3 is thus axially balanced since the magnetic attraction urges it toward the closed end of the frame 1, while the thrust dynamic pressure urges it toward the open end of the frame 1.

The lubricant which filled in the open side space 25a and the closed side space 25b results in the spaces 25a and 25b functioning as lubricant reservoirs. These reservoirs help hold the revolving shaft 3 in place when it is subjected to vibrations or shock.

If, for example, a vibration or shock is applied so as to push the revolving shaft 3, the volume of the closed side lubricant reservoir 25b is reduced. To offset this occurrence, a substantial flow resistance is applied to any lubricant within the closed side lubricant reservoir 25b by the narrow gap A. The narrow gap A thus acts as a throttle and prevents vibrational movement of the revolving shaft 3 toward the closed end of the frame 1.

If, on the other hand, a vibration or shock is applied so as to pull the revolving shaft 3, the volume of the open side lubricant reservoir 25a is reduced. To offset this occurrence, a substantial flow resistance is applied to any lubricant within the open side lubricant reservoir 25a by the narrow gap A and a sliding surface of the radial-slide bearing 2. The narrow gap A and the sliding surface of the radial-slide bearing 2 thus act as a throttle and prevent vibrational movement of the revolving shaft 3 toward the open end of the frame 1.

The present invention according to the first embodiment has many advantages. In particular, the narrow gap A acts as a throttle and prevents vibrational movement of the revolving shaft 3 in the thrust direction if vibration or shock is applied to either push or pull the revolving shaft 3. Also, a loss in torque can be reduced to a substantial extent since such loss occurs in the narrow gap A which defines a small area. Additionally, it is easy to control manufacturing tolerances since only the narrow gap A in its circumferential direction requires severe manufacturing tolerances. As a result, in the first embodiment of the present invention, it is possible to stabilize the revolving shaft 3 against vibrational movement in the thrust direction and reduce loss in torque, without requiring severe manufacturing tolerances.

Another advantage of the first embodiment resides in the fact that the large diameter portion 23 serves as a stopper. This results in a decrease in the number of parts since a separate stopper is not required.

The first embodiment is also designed such that a magnetic attraction is provided to urge the revolving shaft 3 toward the closed end of the frame 1. This feature eliminates the need for thrust dynamic pressure grooves and, as such, results in a reduced production cost.

The first embodiment also provides an advantage inherent in the large diameter portion 23. That is, the thrust dynamic pressure developed between the surface 23a of the large diameter portion 23 and the bottom 1b is more effective than a thrust dynamic pressure developed between the lower end 3a of the revolving shaft 3 and the bottom 1b.

The configuration of the first embodiment is defined by a number relationships. The size of the narrow gap A is inversely proportional to a cube of a throttle effect and a loss in torque. Practically, it is inversely proportional to a square of the throttle effect/loss in torque. As such, it is preferable to define the narrow gap A to be as small as possible. The narrow gap A, which is substantially equal to a clearance between the sliding surface of the radial-slide bearings 2 and the revolving shaft 3, is preferably in a range from 3 to 30 μm.

The greater the factor n, which is defined to equal $r2/r1$, the greater the outer diameter of the large diameter portion 23. As the outer diameter of the large diameter portion 23 increases, an area of a portion wherein pressure is developed increases.

The throttle effect is proportional to $(n^3-2n+1/n)$, whereas, the loss in torque is proportional to $n^3$. Therefore, the throttle effect/loss in torque is proportional to $(1-2/n^2+1/n^4)$. In the first embodiment, n is most preferably in the range from 1.2 to 3.0.

Figure 3:
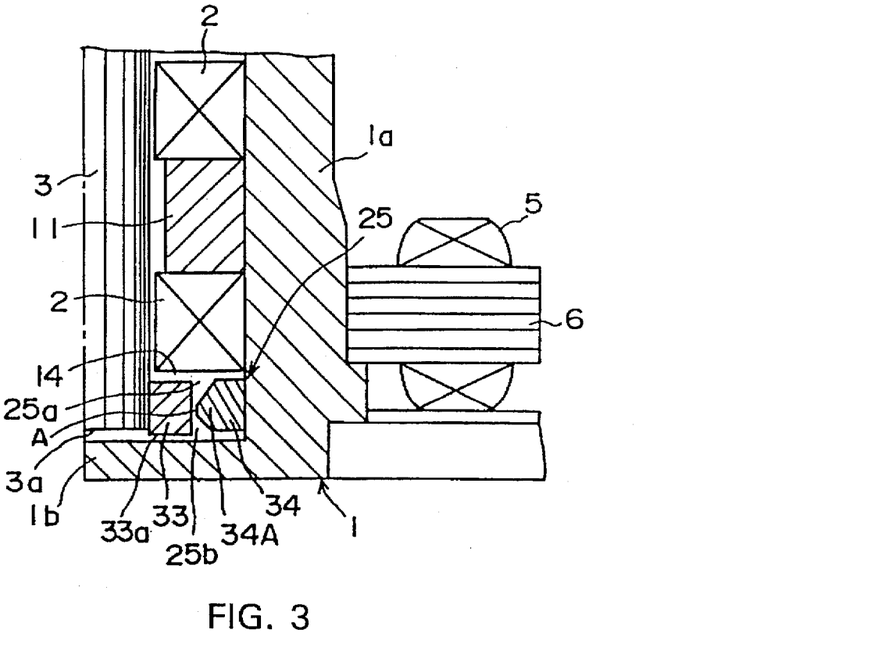
FIG. 3 illustrates a transverse sectional view showing a spindle motor for use in a hard disk drive into which a dynamic pressure bearing device is incorporated according to a second embodiment of the present invention.

FIG. 3 is a transverse sectional view showing a second embodiment of the present invention. Parts which are identical to and function in the same way as those referred to in the first embodiment are given like reference numerals and will not be described herein.

The dynamic pressure bearing device of the second embodiment differs from that of the first embodiment in that in the second embodiment an annular large diameter portion 33 is substituted for the large diameter portion 23. The large diameter portion 33 has an outer diameter larger than the diameter r3, as shown in FIG. 2, of the sliding surface of the radial-slide bearing 2. A ring-shaped fixed member 34 is secured to the bearing holder 1a and includes a projection 34A. The projection 34A faces the outer peripheral surface of the annular large diameter portion 33. A narrow gap A is formed between the projection 34A and the large diameter portion 33. This arrangement offers the same advantages as those described for the first embodiment.

Figure 4:
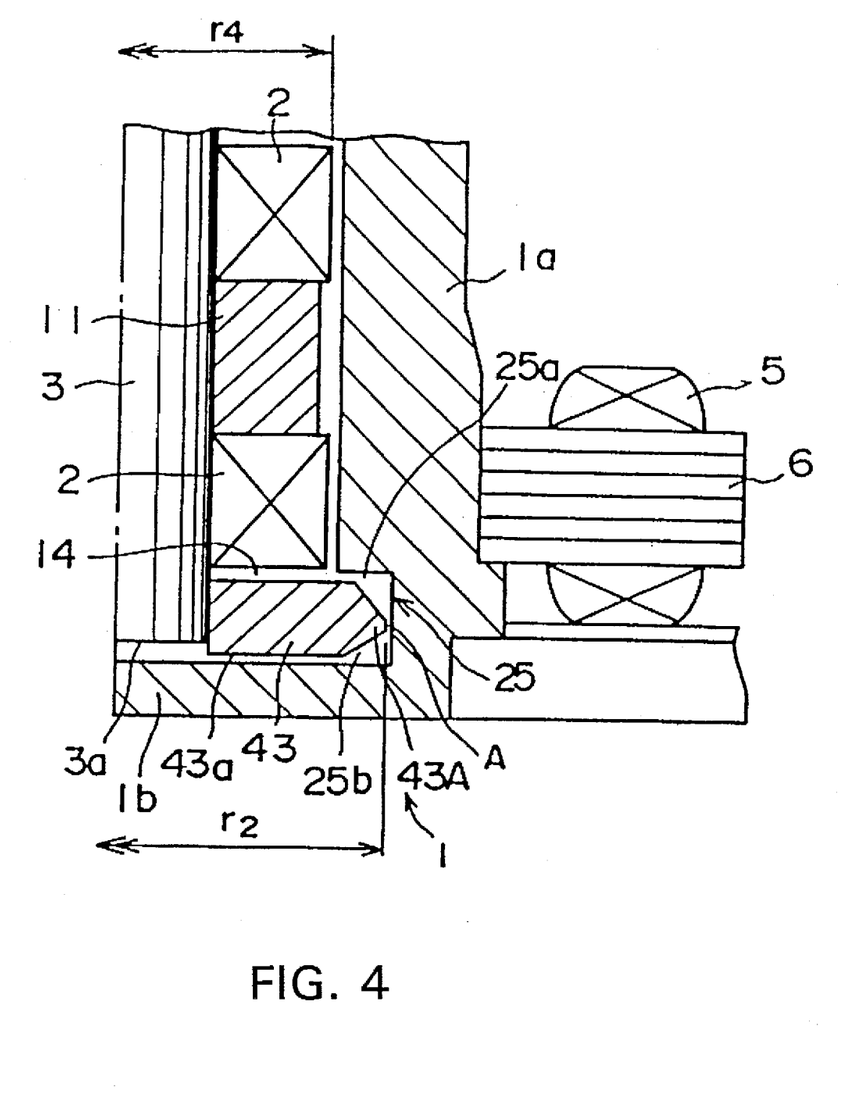
FIG. 4 illustrates a transverse sectional view showing a spindle motor for use in a hard disk drive into which a dynamic pressure bearing device is incorporated according to a third embodiment of the present invention.

FIG. 4 is a transverse sectional view according to a third embodiment of the present invention. This motor is of the type in which the radial-slide bearings 2 are fixed to the revolving shaft 3 and rotated. In the dynamic pressure bearing device of the third embodiment, a large diameter portion 43, which is basically identical in structure to the large diameter portion 23 as described in the first embodiment, is located closer to the closed end of the frame 1 than the radial-slide bearing 2 adjacent to the closed end of the frame 1. The large diameter portion 43 has an outer diameter r2 greater than the diameter r4 of the sliding surface of the radial-slide bearings 2.

The bearing holder 1a defines an annular recess 25 to receive the large diameter portion 43. A narrow gap A is formed between a peripheral surface of the recess 25 and the projection 43A of the large diameter portion 43. This arrangement offers the same advantages as those described in the first and second embodiments.

It is of course to be understood that various changes may be made to the first through third embodiments without departing from the scope of the invention. For example, the projections 23A, 34A and 43A each have a short dimension L, as defined in FIG. 2, to minimize a loss in torque. Alternatively, the dimension L of projections 23A, 34A and 43A may respectively be substantially the same as that of the portions the large diameter portions 23, 34 and 43 which connect to the revolving shaft 3, the bearing holder 1a and the revolving shaft 3. That is, the large diameter portions 23, 34 and 43 may be substantially in the form of a circular disk. Loss in torque will be greater in such a case than in the foregoing embodiments, but the same advantages of the present invention can still be obtained.

In the foregoing embodiments, the surfaces 23a, 33a and 43a of the large diameter portions 23, 33 and 43 project from the lower end 3a of the revolving shaft 3 to develop a thrust dynamic pressure between the surfaces 23a, 33a and 43a and the bottom 1b of the frame 1. Alternatively, the surfaces 23a, 33a and 43a may be substantially flush with the lower end 1b of the revolving shaft 3, such that a thrust dynamic pressure will be developed between the surfaces 23a, 33a and 43a plus the lower end 3a, and the bottom 1b of the frame 1. Still alternatively, the lower end 3a of the revolving shaft 3 may project from the surfaces 23a, 33a and 43a of the large diameter portions 23, 33 and 43, such that a thrust dynamic pressure is developed between the lower end 3a of the revolving shaft 3 and the bottom 1b. It is to be understood that in such cases, a dynamic pressure groove needs to be formed either the lower end 3a of the revolving shaft 3 or the bottom 1b.

In the foregoing embodiments, the non-compressible fluid used is either an oil or a lubricant. However, the lubricant may be a magnetic fluid or other fluids. Any noncompressible fluid may be filled in the space within which the large diameter portions 23, 33 and 43 are received so long as the narrow gap A provides a throttle action.

There are many advantages associated with the devices described above. Specifically, the narrow gap A, which operates as a throttle, prevents a vibrational movement of the revolving shaft 3 in a thrust direction if vibration or shock is applied to push or pull the revolving shaft 3. Also, losses in torque can be reduced to a substantial extent since such losses occur in the narrow gap A which defines a small area. Additionally, it is easy to control manufacturing tolerances since only the narrow gap A in its circumferential direction requires severe manufacturing tolerances. For these reasons, it is possible to prevent the revolving shaft 3 from movement in the thrust direction while simultaneously reducing losses in torque, without the requirement of severe manufacturing tolerances.

The dynamic pressure bearing device shown in FIG. 4 includes a large diameter portion 33 which serves as a stopper. An advantage of this arrangement is that a separate stopper is not required.

The first embodiment provides an advantage in the magnetic attraction created to urge the revolving shaft 3 toward the closed end of the frame 1. This feature eliminates the need for thrust dynamic pressure grooves and, as such, results in a reduced production cost.

The first embodiment also provides the advantage inherent in the large diameter portion 23. That is, the thrust dynamic pressure developed between the surface 23a of the large diameter portion 23 and the bottom 1b is more effective than a thrust dynamic pressure developed between the lower end 3a of the revolving shaft 3 and the bottom 1b.

An advantage can also be found in the first through third embodiments by forming a dynamic pressure groove in either surfaces 23a, 33a and 43a of the large diameter portions 23, 33 and 43 or the bottom 1b of the frame 1.

Advantages in the first through third embodiments are present when the narrow gap A, which is substantially equal to a clearance between the sliding surface of the radial-slide bearings 2 and the revolving shaft 3, is in the range from 3 to 30 μm.

Also advantages in the first through third embodiments are present when the throttle effect/loss in torque, which is proportional to $(1-2/n^2+1/n^4)$, is defined by n being in the range from 1.2 to 3.0.

Advantages can be found in the first through third embodiments by the shapes of large diameter portions 23, 33 and 43. That is, the large diameter portions 23, 33 and 43 each maintain a width which decreases toward their outer projections 23A, 34A and 43A, and as such define a means for preventing vibrational movement of a shaft in the motor while simultaneously minimizing a loss of torque in the motor.

Figure 5:
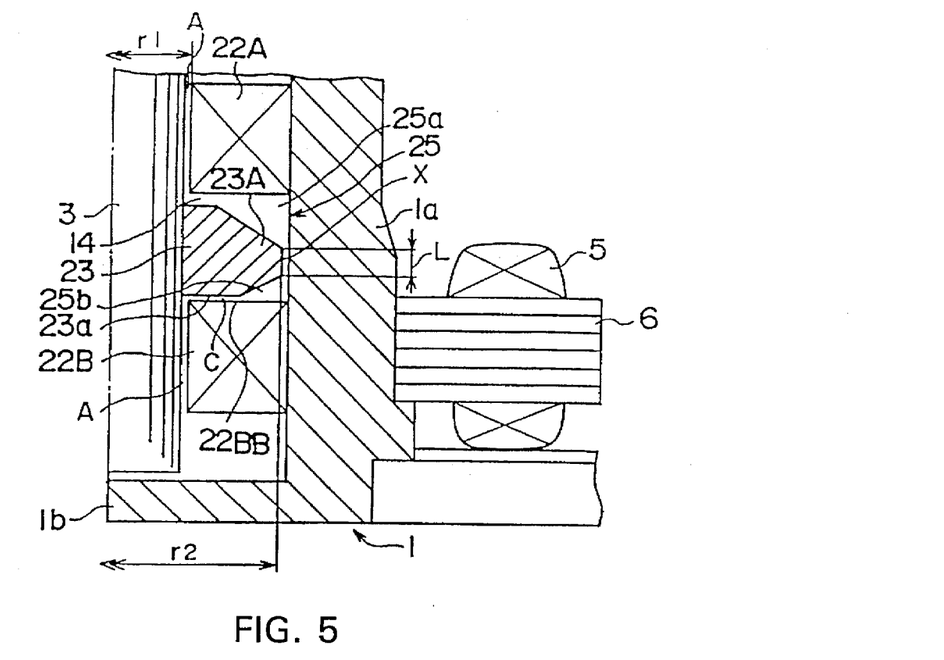
FIG. 5 illustrates a transverse sectional view showing a motor for use in a hard disk drive into which a dynamic pressure bearing device is incorporated according to a fourth embodiment of the present invention.

FIG. 5 is a transverse sectional view showing a motor for use in a hard disk drive into which a dynamic pressure bearing device is incorporated according to a fourth embodiment of the present invention. The motor shown in FIG. 5 is of the type which includes a revolving center shaft and fixed radial-slide bearings.

Referring to FIG. 5, two radial-slide bearings 22A and 22B are provided in the form of a projection and fixed to a bearing holder 1a. These radial-slide bearings 22A and 22B are spaced away from each other in an axial direction. Specifically, a space 25 is defined between the ends of the radial-slide bearings 22A and 22B. A revolving shaft 3, which forms part of the motor, is provided to face the radial-slide bearings 22A and 22B. A projection 23 extends from the revolving shaft 3 into space 25 between the radial-slide bearings 22A and 22B and has an outer diameter r2 which is greater than an inner diameter r1 of each of the radial-slide bearings 22A and 22B. The projection 23 is substantially in the form of an abacus half. The projection 23 has an increasing outer diameter which is maximized at projected end 23A. A narrow gap X is defined between the projected end 23A of the projection 23 and the bearing holder 1a.

A thrust dynamic pressure groove is formed in either a surface 23a adjacent to the closed end of the frame 1 or a surface 22BB of the confronting radial-slide bearing 22B.

In this embodiment, the narrow gap X is in the range between 3 and 30 μm. Additionally, a factor n1, which equals r2/r1, is in the range from 1.2 to 3.0, where r1 is the inner diameter of the radial-slide bearings 22A and 22B and r2 is the maximum outer diameter of the projection 23.

The projection 23 axially divides space 25 into two parts—an open side space 25a above the narrow gap X and a closed side space 25b below the narrow gap X. A lubricant 14, which is a non-compressible fluid, is filled in the recess of the bearing holder 1a and in the space 25 below a magnetic-fluid seal 8 which is not shown; As such, a thrust dynamic pressure is developed in a space C between the surface 23a of the projection 23 and the end 22BB of the radialslide bearing 22B so as to urge the revolving shaft 3 toward the open end of the frame 1.

A stator core 6 has a magnetic center which is offset from that of a drive magnet 7. This arrangement produces a magnetic attraction to urge the revolving shaft 3 toward the closed end of the frame 1. This results in the revolving shaft 3 being well balanced since the magnetic attraction urges it toward the closed end of the frame 1, and the thrust dynamic pressure urges it toward the open end of the frame 1.

The lubricant 14, which is filled in the open side space 25a and the closed side space 25b, results in the spaces 25a and 25b functioning as lubricant reservoirs. Or, in other words, the open side space 25a and the closed side space 25b respectively function as an open side lubricant reservoir 25a and a closed side lubricant reservoir 25b.

Thus, if a vibration or shock is applied in a direction such that the revolving shaft 3 were pushed, the volume of the closed side lubricant reservoir 25b is reduced. The lubricant within the closed side lubricant reservoir 25b is then caused to flow through the narrow gap X and a sliding portion A of the radial slide bearing 22B. The narrow gap X and the sliding portion A of the radial-slide bearing 22B provide a substantial flow resistance to the lubricant and act as a throttle to prevent vibrational movement of the revolving shaft 3 toward the closed end of the frame.

On the other hand, if a vibration or shock is applied in such a direction such that the revolving shaft 3 were pulled, the volume of the open side lubricant reservoir 25a is reduced. The lubricant within the open side lubricant reservoir 25a is then caused to flow through the narrow gap X and a sliding portion A of the radial-slide bearing 22A. The narrow gap X and the sliding portion A of the radial-slide bearing 22A provide substantial flow resistance and act as a throttle to prevent vibrational movement of the revolving shaft 3 toward the open end of the frame 1.

In this embodiment, it is clear that the narrow gap X acts as a throttle to prevent vibrational movement of the revolving shaft 3, if a vibration or shock is applied to push or pull the revolving shaft 3. This enables a substantial reduction in the loss of torque since such loss occurs in the narrow gap X which defines a small area. By the same token, only the narrow gap X in its circumferential direction requires severe manufacturing tolerances. As a result, it easier to control such manufacturing tolerances. It is thus possible to stabilize the revolving shaft 3 against vibrational movement in the thrust direction while simultaneously preventing undesirable losses in torque, without requiring severe manufacturing tolerances.

There are many advantages associated with the fourth embodiment. In particular, the projection 23 serves as a stopper. This is a beneficial feature given that it results in a decrease in the number of parts since a separate stopper is not required. Additionally, a thrust dynamic pressure is developed in the space C between the projection 23 and the radial slide bearing 22B. This arrangement eliminates the need for the annular thrust plate 13 shown in the FIG. 1 and thus further reduces the number of parts.

The throttle action of the fourth embodiment, as previously described, prevents movement of the revolving shaft 3 in the thrust direction upon application of vibration and shock. Also, the magnetic attraction created between the stator core 6 and drive magnet 7 provides a thrust dynamic pressure to urge the revolving shaft 3 toward the closed end of the frame 1 which results in a revolving shaft 3 which is normally balanced. Moreover, this arrangement requires a fewer number of thrust dynamic pressure grooves as compared to the device shown in FIG. 1, which results in a decreased production cost.

The narrow gap X, as described in the fourth embodiment, is inversely proportional to a cube of the throttle effect as well as to the loss of torque. Practically, the narrow gap X it is inversely proportional to the square of the throttle effect/loss in torque. As such, it is preferable to define the narrow gap X to be as small as possible. The narrow gap X, which is substantially equal to a clearance between the sliding surfaces A of the radial-slide bearings 22A and 22B and the revolving shaft 3, is preferably in the range from 3 to 30 μm.

Also, the greater the factor n1, which is defined to equal r2/r1, the greater the flow resistance by the throttle. The throttle effect of the fourth embodiment is proportional to $(n1^3 - 2n1 + 1/n1)$, and the loss of torque is proportional to $n1^3$. Therefore, the throttle effect/loss in torque is proportional to $(1 - 2/n1^2 + 1/n1^4)$. The effective range of the factor n1 is in the range between 1.2 and 3.0.

Figure 6:
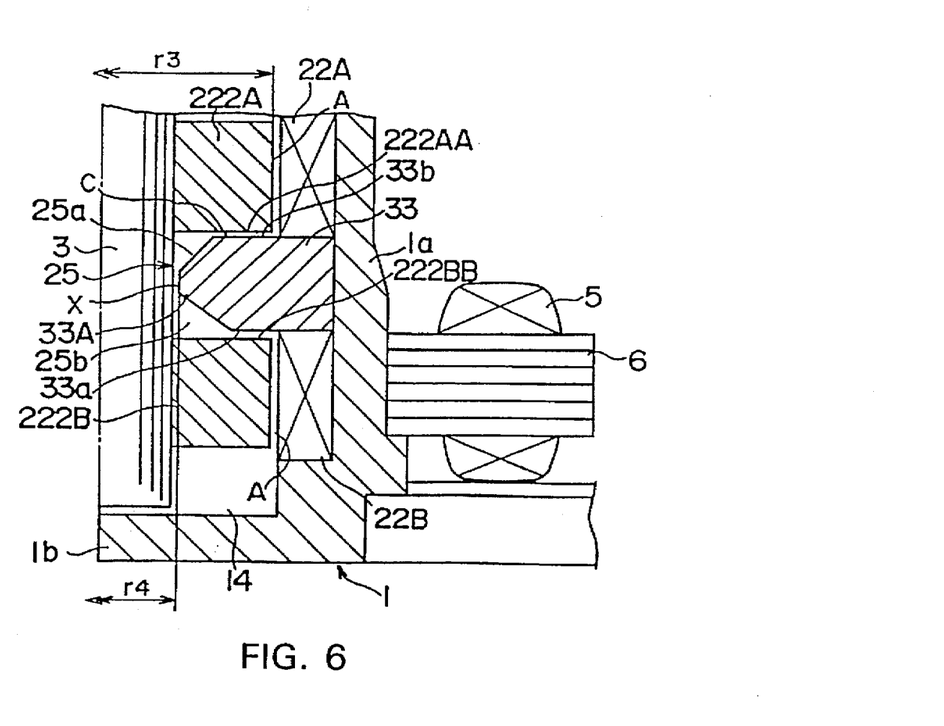
FIG. 6 illustrates a transverse sectional view showing a motor for use in hard disk drive into which a dynamic pressure bearing device is incorporated according to a fifth embodiment of the present invention.

FIG. 6 is a transverse sectional view showing a motor for use in a hard disk drive into which a dynamic pressure bearing device is incorporated according to a fifth embodiment of the present invention. The motor shown in FIG. 6 is of the type which includes a center shaft and fixed radial-slide bearings. Parts which are identical to and function in the same way as those referred to in the fourth embodiment are given like reference numerals and will not be described herein.

In the fifth embodiment, two large diameter portions 222A and 222B extend from the revolving shaft 3 and face radial-slide bearings 22A and 22B, respectively. A projection 33 extends from the bearing holder 1a into a space 25 which is formed between the large diameter portions 222A and 222B. The projection 33 defines a inner diameter r4 which is smaller than the outer diameter r3 of each of the large diameter portions 222A and 222B. The projection 33 is shaped such that it has a diameter which increases toward a projected end 33A. A narrow gap X is defined between the projected end 33A and the revolving shaft 3.

The projection 33 has a surface 33b adjacent to the open end of the frame 1, whereas, the large diameter portion 222A has a surface 222AA adjacent to the surface 33b of the projection 33. A thrust dynamic pressure groove is defined in either the surface 33b of the projection 33 or the surface 222AA of the large diameter portion 222A so as to develop thrust dynamic pressure in a space C between surfaces 33b and 222AA to urge the revolving shaft 3 toward the open end of the frame 1. Normally, the revolving shaft 3 is well balanced since the thrust dynamic pressure urges it toward the open end of the frame 1, whereas the magnetic attraction urges it to the closed end of the frame 1. It is, of course, to be understood that this arrangement offers the same advantages as in the fourth embodiment.

The outer diameter r3 of the radial-slide bearings 222A and 222B and the inner diameter r4 as defined by the projection 33 are such that where a factor n2, which is defined as r4/r3, is in the range between 0.5 and 0.9, the greater the flow resistance by the throttle. This is due m the fact that the surface areas where pressure is developed increases. The throttle effect of the fifth embodiment is proportional to $(n2^3 - 2n2 + 1/n2)$, and the loss of torque is proportional to $n2^3$. Therefore, the throttle effect/loss in torque is proportional to $(1 - 2/n2^2 + 1/n2^4)$. The effective range of the rate n2 is in the range between 0.5 and 0.9 so as to make the dynamic pressure bearing device most practical and effective.

As in the fourth embodiment, a thrust dynamic pressure groove may be formed in either a surface 33a of the projection 33 or a surface 222BB of the large diameter portion 222B adjacent m the closed end of the frame 1 so as to develop thrust dynamic pressure therebetween to urge the revolving shaft 3 toward the closed end of the frame 1. In such a case, however, it is necessary to produce magnetic attraction in a direction opposite to that of the thrust dynamic pressure.

Figure 7:
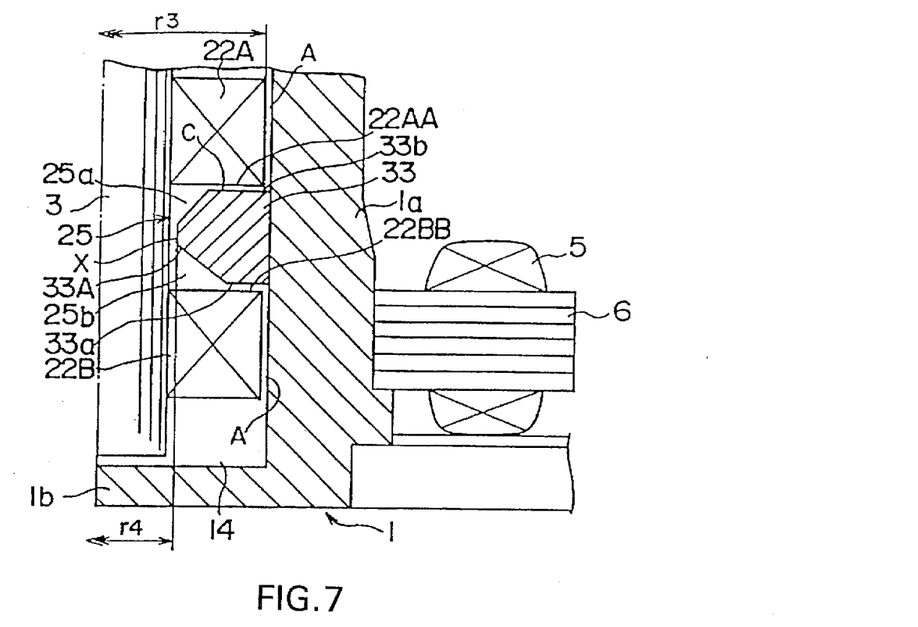
FIG. 7 illustrates a transverse sectional view showing a motor for use in a hard disk drive into which a dynamic pressure bearing device is incorporated according to a sixth embodiment of the present.

FIG. 7 is a transverse sectional view showing a motor for a hard disk drive into which a dynamic pressure bearing device incorporated according to a sixth embodiment of the present invention. The motor shown in FIG. 7 is of the type which includes a center shaft and fixed radial-slide bearings. Parts which are identical to and function in the same way as those referred to in the fourth embodiment are given like reference numerals and will not be described herein.

In the sixth embodiment, two radial-slide bearings 22A and 22B are provided in the form of a projection and fixed to the revolving shaft 3. As in the fifth embodiment, a projection 33 extends from the bearing holder 1a into a space 25 between the radial-slide bearings 22A and 22B.

The projection 33 defines an inner diameter r4 which is smaller than an outer diameter r3 of each of the radial-slide bearings 22A and 22B.

A thrust dynamic pressure groove is defined in either a surface 33b of the projection 33 or a surface 22AA of the radial-slide bearing 22A adjacent to the open end of the frame 1, so as to develop a thrust dynamic pressure in a space C to urge the revolving shaft 3 toward the open end of the frame 1. This results in the revolving shaft 3 being well balanced since the thrust dynamic pressure urges it toward the open end of the frame 1, as compared to a magnetic attraction which urges it toward the closed end of the frame 1.. It is of course to be understood that the sixth embodiment of the invention offers the same advantages as the fourth and fifth embodiments of the invention.

Figure 8:
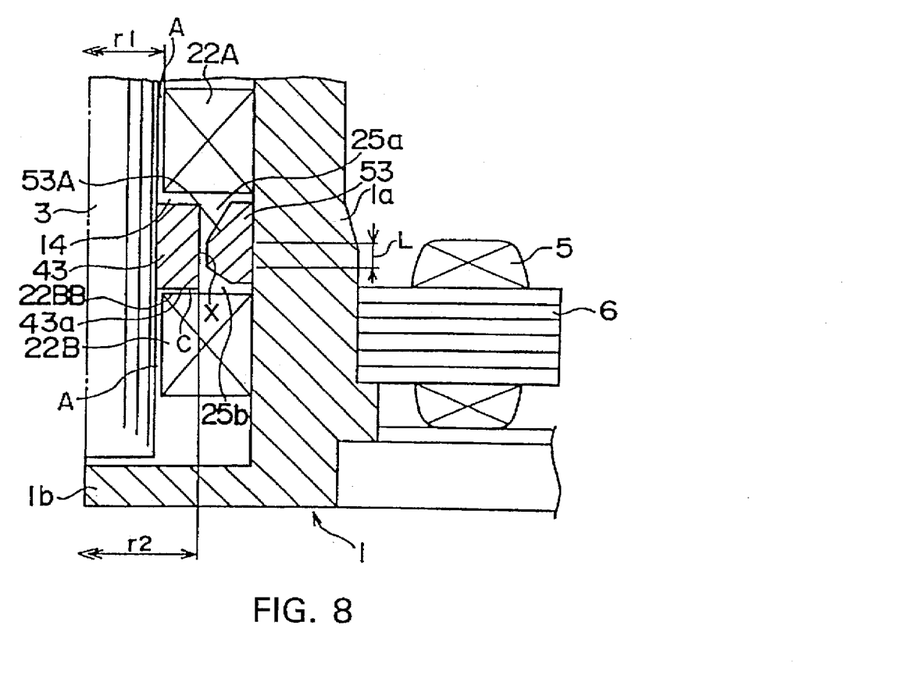
FIG. 8 illustrates a transverse sectional view showing a motor for use in a hard disk drive into which a dynamic pressure bearing device is incorporated according to a seventh embodiment of the present invention.

FIG. 8 is a transverse sectional view showing a motor for a hard disk drive into which a dynamic pressure bearing device is incorporated according to a seventh embodiment of the present invention. The motor shown in FIG. 8 is of the type which includes a center shaft and fixed radial-slide bearings.

The seventh embodiment is different from the fourth embodiment in that in lieu of an abacus-shaped projection 23 being attached to the shaft 3, a circular projection 43 is attached to the shaft 3. The circular projection 43 is defined to have an outer diameter r2 greater than the diameter r1 of the sliding surface of each of the radial-slide bearings 22A and 22B. A ring-shaped or annular member 53 faces an outer periphery of the circular projection 43 and is fixed to a bearing holder 1a. The annular member 53 has a projected end 53A on its periphery, as in the fifth and sixth embodiments, so as to define a narrow gap X between the projected end 53A and the projection 43. A thrust dynamic pressure groove is formed in either a surface 43a of the projection 43 or a surface 22BB of the lower radial-slide bearing 22B adjacent to the closed end of the frame 1.

This arrangement offers the same advantages as in the fourth through sixth embodiments. Moreover, the design of the seventh embodiment may be applied to the designs in the fourth through sixth embodiments, by removing the projected ends 23A and 33A so that the projections 23 and 33 may be in the form of a ring. Also, the projections 23 and 33, as used in the fourth through sixth embodiments, may be faced with a ring-shaped projection 43, as shown in FIG. 8 for the seventh embodiment.

Although the fourth through seventh embodiments of the present invention have been described above, the present invention is not .limited thereto. Various modifications may be made without departing from the scope of the invention. For example, in the fourth through seventh embodiments, the length L of each of the projected ends 23A, 33A and 53A is designed to be as short as possible to minimize loss of torque. Alternatively, this dimension may be the same as a dimension of a portion of the projections 23, 33 or 53 that is connected to members 3 or 1a. Or, in other words, the projections 23, 33 or 53 may be substantially in the form of a ring. In such a case, the loss of torque may be greater than the foregoing embodiments, but the same advantages can still be obtained.

The thrust dynamic pressure grooves, as described for the fourth through seventh embodiments, may be placed in different locations depending on the type of motor used. For example, the thrust dynamic pressure grooves in the fourth and seventh embodiments could alternatively be formed in either a surface of the bearing 22A adjacent to the projections 23 and 43 or a surface of the projections 23 and 43. In the fifth embodiment, the thrust dynamic pressure groove could alternatively be formed in either a surface of the large diameter portion 222B adjacent to the projection 33 or a surface of the projection 33. In the sixth embodiment, the thrust dynamic pressure groove could alternatively be formed in either a surface of the bearing 22B adjacent to the projection 33 or on a surface of the projection 33. If the thrust dynamic pressure grooves are formed in these alternative locations, then a magnetic attraction needs be produced in a direction opposite to the direction disclosed above for each of the embodiments.

A thrust dynamic pressure may also be developed between members other than the projections 23, 33 and 43 and the projected parts. For example, referring to FIG. 1, a thrust dynamic pressure may be developed between the annular thrust plate 13 and a projected part.

Also, being that a throttle is present to prevent movement of the center shaft in the thrust direction upon application of vibration and shock, and a thrust dynamic pressure is obtained by magnetic attraction, it may not be necessary to form a thrust dynamic pressure groove for the development of additional thrust dynamic pressure.

In the fourth through seventh embodiments, the projections 23, 33, and 53 are shown as axially symmetric, but may be axially asymmetric. Also, three or more projections may be used. Additionally, with respect to the fourth through seventh embodiments, the noncompressible fluid may include oil, other lubricants, magnetic fluids or any noncompressible fluid, so long as the fluid acts as a throttle.

Figure 9:
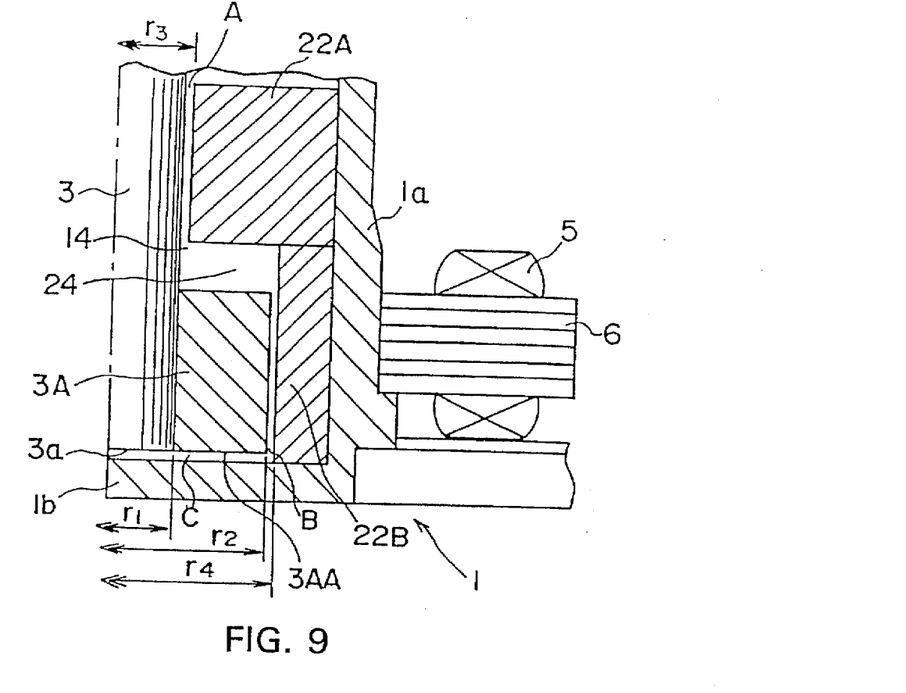
FIG. 9 illustrates a transverse sectional view showing a motor for use in a hard disk drive into which a dynamic pressure bearing device is incorporated according to an eighth embodiment of the present invention; and, FIG. 10 illustrates a transverse sectional view showing a motor for use in a hard disk drive into which a dynamic pressure bearing device is incorporated according to a ninth embodiment of the present invention.

FIG. 9 is a transverse sectional view showing a motor for use in a hard disk drive into which a dynamic pressure bearing device is incorporated according to an eighth embodiment of the present invention. Referring to FIG. 9, an inner diameter r4 of a radial-slide bearing 22B adjacent to a closed end of a frame 1 is greater than an inner diameter r3 of a radial-slide bearing 22A adjacent to an open end of the frame 1. The radial-slide bearings 22A and 22B are fixed to a bearing holder 1a of the frame 1.

A revolving shaft 3 includes a large diameter portion 3A adjacent to the closed end of the frame 1. The large diameter portion 3A faces the radial-slide bearing 22B. The large diameter portion 3A has an outer diameter r2 which is greater than the inner diameter r3 of the radial-slide bearing 22A. The radial-slide bearing 22A and the large diameter portion 3A are spaced away from each other in an axial direction. That is, a space 24 is defined between the radial-slide bearing 22A and the large diameter portion 3A. The large diameter portion 3A may be separated from or integral with the revolving shaft 3.

The revolving shaft 3 has an outer diameter r1. The outer diameter r1 of the revolving shaft 3 and the outer diameter r2 of the large diameter portion 3A are such that a factor n, which is defined to equal r2/r1, is in a range from 1.1 to 1.7.

The large diameter portion 3A has one end 3AA adjacent to the closed end of the frame 1, where the end 3AA of the large diameter portion 3A is flush with one end 3a of the revolving shaft 3 adjacent to the closed end of the frame 1. A thrust dynamic pressure groove is defined in either the end 3AA, end 3a or the bottom 1b.

A lubricant 14, which is a noncompressible fluid, is filled in the recess of the bearing holder 1a below a magnetic fluid seal 8, which is not shown, as well as in space 24. As such, a thrust dynamic pressure is developed between the end 3AA connected to the end 3a and the bottom 1b, thereby urging the revolving shaft 3 toward the open end of the frame 1.

A stator core 6 has a magnetic center which is offset from that of a drive magnet 7. This known arrangement produces a magnetic attraction to urge the revolving shaft 3 toward the closed end of the frame 1. Normally, the revolving shaft 3 is well balanced in the axial direction since the magnetic attraction urges the shaft 3 toward the closed end of the frame 1, whereas the thrust dynamic pressure urges the shaft 3 toward the open end of the frame 1.

The space 24, which is filled with the lubricant 14, serves as a lubricant reservoir. Thus, if a vibration or shock is applied such that the revolving shaft 3 is pushed, the volume of a space C above the bottom 1b is reduced. The lubricant 14 within the space C is then caused to flow through a sliding portion B of the radial-slide bearing 22B. This sliding portion B provides substantial flow resistance and as such acts as a throttle to prevent vibrational movement of the revolving shaft 3 toward the closed end of the frame 1.

If, on the other hand, a vibration or shock is applied such that the revolving shaft 3 is pulled, the volume of the space 24 between the radial-slide bearing 22A and the large diameter portion 3A is reduced. The lubricant 14 filled within the space 24 is then caused to flow through the sliding portions A and B of the radial-slide bearings 22A and 22B, respectively. These sliding portions A and B provide substantial flow resistance and as such act as a throttle to prevent vibrational movement of the revolving shaft 3 toward the open end of the frame 1.

There are many advantages to the eighth embodiment of the present invention. In particular, the sliding portions A and B of the radial-slide bearings 22A and 22B act as a throttle and prevent vibrational movement of the revolving shaft 3 in the thrust direction if a vibration or shock is applied to push or pull the revolving shaft 3. Also, under this arrangement, there is no undesirable loss in torque of the motor. Similarly, only the sliding surfaces in their circumferential direction require severe manufacturing tolerances, and no other parts in the thrust direction require severe manufacturing tolerances. This makes it easier to control such tolerances. It is therefore possible to stabilize the revolving shaft 3 against vibrational movement in the thrust direction and prevent an undesirable loss in torque, without requiring severe manufacturing tolerances.

The large diameter portion 3A serves as a stopper. This results in a decrease in the number of parts since a separate stopper is not required.

The end 3AA of the large diameter portion 3A, as well as the end 3a of the revolving shaft 3, and the bottom 1b of the recess cooperate to develop a thrust dynamic pressure. This arrangement eliminates the need for the annular thrust plate 13, as shown in FIG. 1, and thus reduces the number of parts.

Being that the throttle action prevents movement of the revolving shaft 3 in the thrust direction upon application of vibration and shock, and the magnetic attraction provides a thrust dynamic pressure to urge the revolving shaft 3 towards the closed end of the frame 1 to balance the revolving shaft 3, a fewer number of thrust dynamic pressure grooves are required. As a result, there is a decrease in production costs.

As a factor n, which is defined to equal r2/r1, increases the throttle action of the eighth embodiment becomes more effective. However, if the outer diameter r2 of the large diameter portion 3A differs largely from the outer diameter r1 of the revolving shaft 3, the optimal design may deteriorate. As a result, the factor n preferably is in the range from 1.1 to 1.7.

Figure 10:
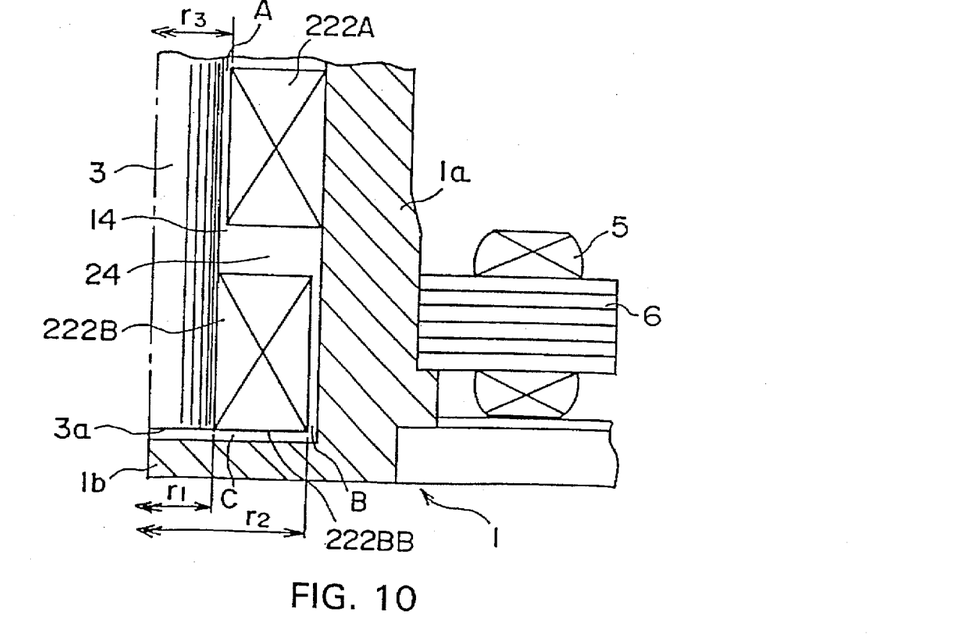

FIG. 10 is a transverse sectional view showing a motor for use in a hard disk drive into a dynamic pressure bearing device is incorporated according to a ninth embodiment of the present invention. Parts which are identical to and function in the same way as those referred to in the eighth embodiment are given like reference numerals and will not be described herein.

In the ninth embodiment, a dynamic pressure bearing device is provided with two radial-slide bearings 222A and 222B. The radial-slide bearing 222B is located adjacent to the closed end of the frame 1 and has an outer diameter r2 greater than the inner diameter r3 of the radial-slide bearing 222A which is located adjacent to the open end of the frame 1. The radial-slide bearings 222A and 222B are axially spaced away from each other to define a space 24 between a lower end of the radial slide bearing 222A and an upper end of the radial-slide bearing 222B. The radial-slide bearings 222A and 222B are fixed to the bearing holder 1a of the frame 1 and the revolving shaft 3, respectively.

The radial-slide bearing 222B has an end 222BB adjacent to the closed end of the frame 1 which is flush with an end 3a of the revolving shaft 3. A thrust dynamic pressure groove is formed in either end 222BB, end 3a or bottom 1b. It is, of course, to be understood this arrangement also offers the same advantages as in the previous embodiment.

Although the eighth and ninth embodiments of the present invention have been described, the present invention is not limited thereto. Various changes may be made without departing from the scope of the invention. For example, in the eighth and ninth embodiments, the end 3AA of the large diameter portion 3A and the end 222BB of the radial-slide bearing 222B are flush with the end 3a of the revolving shaft 3. Also, in these embodiments, a thrust dynamic pressure groove is formed either end 3AA, end 222BB, end 3a or the bottom 1b to develop thrust dynamic pressure between (i) end 3AA, end 222BB, or end 3a and (ii) the bottom 1b. Alternatively, the thrust dynamic pressure groove may be formed in either end 3AA and end 222BB or the bottom 1b of the recess 1b to develop a thrust dynamic pressure between (i) end 3AA or end 222BB and (ii) the bottom 1b. Also, end 3AA and end 222BB may project downwardly from the end 3a. Still alternatively, the end 3a may project downwardly from the end 3AA and end 222BB, and the thrust dynamic pressure groove may be formed in either the end 3a or the bottom 1b to develop a thrust dynamic pressure between the end 3a and the bottom 1b.

In the eighth and ninth embodiments, the noncompressible fluid includes either oil or other lubricants. The noncompressible fluid is not limited thereto and may include a magnetic fluid or other fluids. Particularly, the fluid to be filled in the space 24 may be any noncompressible fluid as long as it acts as a throttle.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

We claim:

1. A dynamic pressure bearing device for use in a motor, the motor including a shaft and a frame, said bearing device comprising:

a first bearing being connected to one of said shaft and said frame;

a second bearing being connected to one of said shaft and said frame;

a noncompressible fluid filled in a region between said shaft and said frame; and means for minimizing axial vibrational movement and minimizing a loss of torque in said motor.

2. A dynamic pressure bearing device according to claim 1, wherein:

said first bearing is connected to an upper end of said frame;

said second bearing is connected to a lower end of said shaft;

said first bearing, said second bearing, said shaft, and said frame are arranged to define a space which is filled with said noncompressible fluid; and a geometric configuration of said space said defines said means for minimizing axial vibrational movement.

3. A dynamic pressure bearing device according to claim 1, further comprising a circular projection; wherein:

said first bearing is connected to an upper end of said frame;

said second bearing is connected to a lower end of said frame;

said means for minimizing axial vibrational movement is a device connected to said frame and positioned in a space defined between said first and second bearings, where said device maintains a width which decreases in a direction toward an outward end of said device to minimize a loss in torque;

said circular projection is connected to said shaft in said space defined between said first and second bearings; and, a gap is defined between said outward end of said device and said circular projection to provide a flow resistance to said noncompressible fluid.

4. A dynamic pressure bearing device according to claim 3, wherein:

$r1$ equals a distance from the center of said shaft to an outer surface of said first and second bearings;

$r2$ equals a distance from the center of said shaft to an outer surface of said cellular projection; and $r2$ is greater than $r1$.

5. A dynamic pressure bearing device according to claim 3, wherein said gap is defined to be between a range of 3 to 30 μm.

6. A dynamic pressure bearing device according to claim 1, wherein:

said first bearing is connected to an upper end of said frame;

said second bearing is connected to a lower end of said frame;

said means for minimizing axial vibrational movement is a device connected to a lower end of said shaft in a space defined by said first and second bearing, where said device has an outward end facing said second bearing;

$r3$ equals a distance from the center of said shaft to an outer surface of said first bearing;

$r4$ equals a distance from the center of said shaft to an outer surface of said second bearing; and, $r4$ is greater than $r3$.

7. A dynamic pressure bearing device according to claim 6, wherein:

$r1$ equals a distance from the center of said shaft to an outer surface of said shaft;

$r2$ equals a distance from the center of said shaft to said outward end of said device; and a factor $n$, which equals $r2/r1$, is defined to be between a range of 1.1 to 1.7.

8. A dynamic pressure bearing device according to claim 6, wherein said gap is defined to be between a range of 3 to 30 μm.

9. A dynamic pressure bearing device according to claim 1, wherein:

said first bearing is connected to an upper end of said frame;

said second bearing is connected to a lower end of said frame;

said means for minimizing axial vibrational movement is a device connected to said shaft and positioned in a space defined below said second bearing, where said device maintains a width which decreases in a direction toward an outward end of said device to minimize a loss in torque; and, a gap is defined between said outward end of said device and said frame to provide a flow resistance to said noncompressible fluid.

10. A dynamic pressure bearing device according to claim 9, wherein:

$r1$ equals a distance from the center of said shaft to an outer surface of said shaft;

$r2$ equals a distance from the center of said shaft to said outward end of said device; and a factor $n$, which equals $r2/r1$, is defined to be between a range of 1.2 to 3.

11. A dynamic pressure bearing device according to claim 9, wherein said gap is defined to be between a range of 3 to 30 μm.

12. A dynamic pressure bearing device according to claim 1, further comprising an annular portion which is connected to a lower end of said shaft, wherein:

said first bearing is connected to an upper end of said frame;

said second bearing is connected to a lower end of said frame;

said means for minimizing axial vibrational movement is a device connected to said frame and positioned in a space defined below said second bearing where said device maintains a width which decreases in a direction toward an outward end of said device to minimize a loss in torque; and a gap is defined between said outward end of said device and said annular portion to provide a flow resistance to said noncompressible fluid.

13. A dynamic pressure bearing device according to claim 12, wherein a distance from the center of said shaft to an outer surface of said annular portion is greater than a distance from the center of said shaft to an outer surface of said first and second bearings.

14. A dynamic pressure bearing device according to claim 12, wherein said gap is defined to be between a range of 3 to 30 μm.

15. A dynamic pressure bearing device according to claim 1, wherein:

said first bearing is connected to an upper end of said shaft;

said second bearing is connected to a lower end of said shaft;

said means for minimizing axial vibrational movement is a device connected to said shaft in a space defined below said second bearing, where said device maintains a width which decreases in a direction toward an outward end of said device to minimize a loss in torque; and a gap is defined between said outward end of said device and said frame to provide a flow resistance to said noncompressible fluid.

16. A dynamic pressure bearing device according to claim 15, wherein:

r2 equals a distance from the center of said shaft to said end of said device;

r4 equals a distance from the center of said shaft to an outer surface of said first and second bearings; and r2 is greater than r4.

17. A dynamic pressure bearing device according to claim 15, wherein said gap is defined to be between a range of 3 to 30 μm.

18. A dynamic pressure bearing device according to claim 1, wherein:

said first bearing is connected to an upper end of said frame;

said second bearing is connected to a lower end of said frame;

said means for minimizing axial vibrational movement is a device connected to said shaft and positioned in a space defined between said first and second bearings, where said device maintains a width which decreases in a direction toward an outward end of said device to minimize a loss in torque; and, a gap is defined between said outward end of said device and said frame to provide a flow resistance to said noncompressible fluid.

19. A dynamic pressure bearing device according to claim 18, wherein:

r1 equals a distance from the center of said shaft to an outer surface of said first and second bearings;

r2 equals a distance from the center of said shaft to said end of said device; and a factor n, which equals r2/r1, is defined to be between a range of 1.2 to 3.

20. A dynamic pressure bearing device according to claim 18, wherein said gap is defined to be between a range of 3 to 30 μm.

21. A dynamic pressure bearing device according to claim 1, further comprising a first diameter portion connected to an upper end of said shaft and a second diameter portion connected to a lower end of said shaft, wherein:

said first bearing is connected to an upper end of said frame opposite of said first diameter portion;

said second bearing is connected to a lower end of said frame opposite of said second diameter portion;

said means for minimizing axial vibrational movement is a device connected to said frame and positioned in a space defined between said first and second bearings, where said device maintains a width which decreases in a direction toward an outward end of said device to minimize a loss in torque; and a gap is defined between said outward end of device and said shaft to provide a flow resistance to said noncompressible fluid.

22. A dynamic pressure bearing device according to claim 21, wherein:

r3 equals a distance from the center of said shaft to an outer surface of said first and second large diameter portions;

r4 equals a distance from the center of said shaft to said outward end of said device; and a factor n, which equals r4/r3, is defined to be between a range of 0.5 to 0.9.

23. A dynamic pressure bearing device according to claim 21, wherein said gap is defined to be between a range of 3 to 30 μm.

24. A dynamic pressure bearing device according to claim 1, wherein:

said first bearing is connected to an upper end of said shaft;

said second bearing is connected to a lower end of said shaft;

said means for minimizing axial vibrational movement is a device connected to said frame and positioned in a space defined between said first and second bearings, where said device maintains a width which decreases in a direction toward an outward end of said device to minimize a loss in torque; and, a gap is defined between said outward end of said device and said shaft to provide a flow resistance to said noncompressible fluid.

25. A dynamic pressure bearing device according to claim 24, wherein:

r3 equals a distance from the center of said shaft to an outer surface of said first and second bearings;

r4 equals a distance from the center of said shaft to said outward end of said device; and r4 is smaller than r3.

26. A dynamic pressure bearing device according to claim 24, wherein said gap is defined to be between a range of 3 to 30 μm.

27. A dynamic pressure bearing device according to claim 1, wherein:

said means maintains a width which decreases in a direction toward an outward end of said means to minimize a loss in torque.

* * * * *